United States Patent
Kimelman et al.

(10) Patent No.: US 10,628,312 B2
(45) Date of Patent: Apr. 21, 2020

(54) PRODUCER/CONSUMER PACED DATA TRANSFER WITHIN A DATA PROCESSING SYSTEM HAVING A CACHE WHICH IMPLEMENTS DIFFERENT CACHE COHERENCY PROTOCOLS

(71) Applicant: NXP USA, INC., Austin, TX (US)

(72) Inventors: Paul Kimelman, Alamo, CA (US); Brian Christopher Kahne, Austin, TX (US); Ehud Kalekin, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/142,178

(22) Filed: Sep. 26, 2018

(65) Prior Publication Data

US 2020/0097407 A1    Mar. 26, 2020

(51) Int. Cl.
| | | |
|---|---|---|
| G06F 12/0815 | (2016.01) | |
| G06F 13/40 | (2006.01) | |
| G06F 13/16 | (2006.01) | |

(52) U.S. Cl.
CPC ...... *G06F 12/0815* (2013.01); *G06F 13/1668* (2013.01); *G06F 13/4027* (2013.01); *G06F 2212/1032* (2013.01)

(58) Field of Classification Search
CPC ............. G06F 12/0815; G06F 13/4027; G06F 13/1668; G06F 2212/1032
USPC .......................... 711/141, 145, 144, 119, 121
See application file for complete search history.

(56) References Cited

U.S. PATENT DOCUMENTS

| | | | | |
|---|---|---|---|---|
| 5,960,457 | A * | 9/1999 | Skrovan | G06F 12/0831 711/141 |
| 6,253,234 | B1 * | 6/2001 | Hunt | H04L 67/02 709/213 |
| 6,467,012 | B1 * | 10/2002 | Alvarez | G06F 12/0811 709/213 |
| 7,913,048 | B2 | 3/2011 | Shen | |
| 8,196,147 | B1 | 6/2012 | Srinivasan et al. | |
| 8,621,184 | B1 | 12/2013 | Radhakrishnan et al. | |
| 2002/0073164 | A1 * | 6/2002 | Hagersten | G06F 12/0692 709/215 |
| 2006/0059315 | A1 * | 3/2006 | Moll | G06F 12/0831 711/141 |
| 2009/0276579 | A1 * | 11/2009 | Moyer | G06F 12/0804 711/141 |
| 2009/0327609 | A1 * | 12/2009 | Fleming | G06F 12/0802 711/118 |
| 2013/0282988 | A1 * | 10/2013 | Miller | G06F 12/0808 711/141 |

(Continued)

*Primary Examiner* — Hong C Kim

(57) ABSTRACT

A data processing system including a cache operably coupled to an interconnect and a cache controller. The cache is accessible by each bus initiator of a plurality of bus initiators. The cache includes a plurality of entries. Each entry includes a status field having coherency bits. When an entry of the plurality of entries is in a first protocol mode, the cache controller uses the coherency bits of the entry in implementing a first cache coherency protocol for data of the entry. When the entry is in a second protocol mode, the cache controller uses the coherency bits of the entry in implementing a second cache coherency protocol. The second cache coherency protocol is utilized in implementing a paced data transfer operation between a first bus initiator of the plurality of bus initiators and a second bus initiator of the plurality of bus initiators using the cache entry.

22 Claims, 5 Drawing Sheets

(56) References Cited

U.S. PATENT DOCUMENTS

2014/0208031 A1 7/2014 Raikin et al.
2016/0147658 A1* 5/2016 Ambroladze ......... G06F 12/084
　　　　　　　　　　　　　　　　　　　　711/141

* cited by examiner

PRODUCER/CONSUMER PACED DATA TRANSFER WITHIN A DATA PROCESSING SYSTEM HAVING A CACHE WHICH IMPLEMENTS DIFFERENT CACHE COHERENCY PROTOCOLS

BACKGROUND

Field

This disclosure relates generally to data processing systems, and more specifically, to transferring data between a producer and a consumer within a data processing system having a cache.

Related Art

Within data processing systems, producers commonly need to transfer data to consumers. Traditionally, these producer/consumer transfers use extra hardware outside the memory system such as mailboxes, but this increases the complexity and cost of the data processing system. Alternatively, spin-locks and interrupt based messaging and protections are used for these transfers, however, synchronization, necessary to the safety of the data, is difficult to control. For example, if the producer or consumer gets out of synchronization, old data may be wholly or partially overwritten with new data before being consumed or old data may be read in whole or in part prior to being updated. Therefore, a need exists for an improved producer/consumer system which does not introduce new hardware mechanisms.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Paced consumer/producer data transfer operations are data transfers which occur between producers and consumers in a paced and synchronized manner such that, for example, needed data is not prematurely overwritten with producer writes or old data is not provided in response to consumer reads. A producer/consumer system is implemented using a cache in which cache lines of the cache are used to implement both normal cache operations and paced data transfer operations. A subset of the cache lines of a cache is dynamically selected for use in pacing producer/consumer data transfers by reusing the coherency bits of each cache line such that if a cache line is not selected for pacing data transfer operations but for normal cache operations, the coherency bits are used to implement a memory coherency protocol. However, if the cache line is selected for implementing paced data transfer operations, the same coherency bits are instead used to indicate states of a paced producer/consumer transfer. In one embodiment, the cache lines are selected dynamically based on the address of request. Alternatively, the indication of whether a cache line is used for normal cache operations or paced data transfers can be sent by way of separate sideband signals.

Figure 1:
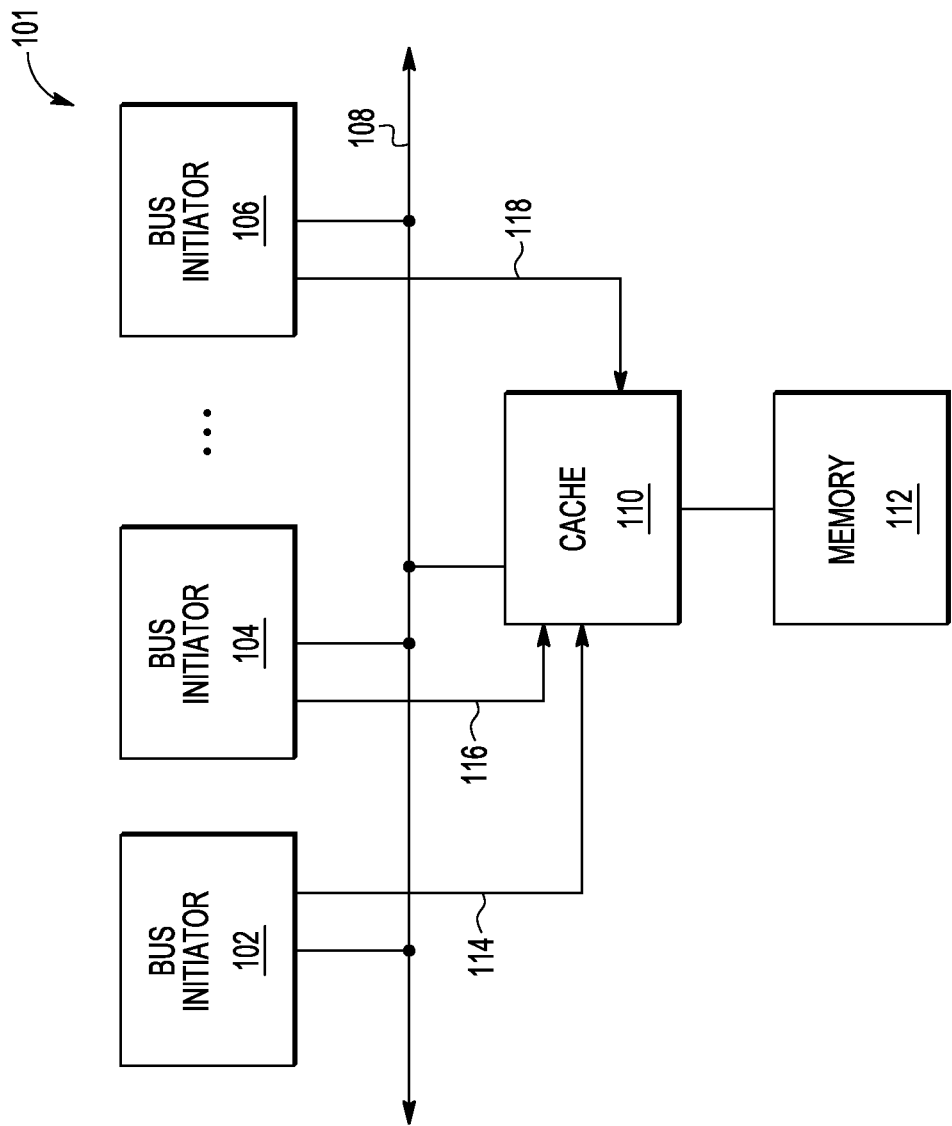
FIG. 1 illustrates, in block diagram form, a producer/consumer data processing system having a cache, in accordance with one embodiment of the present invention.

FIG. 1 illustrates a data processing system 100 in accordance with one embodiment of the present invention. Data processing system 100 includes a system interconnect 108, a cache 110 coupled to system interconnect 108, a memory 112 coupled to cache 110, and a plurality of bus initiators (including bus initiators 102, 104, and 106) coupled to system interconnect 108. Each bus initiator can be any type of bus master, such as a processor core, whether in a cluster to the cache or coupled to system interconnect 108. Each bus initiator can perform reads or reads and writes and may also be referred to as read bus initiators. Data processing system 100 may include any number, one or more, of bus initiators. System interconnect 108 may be a bus or any type of network. In the illustrated embodiment, data processing system 100 also includes sideband signals 114, 116, and 118. These sideband signals allow each of initiator 102, 104, and 106 to communicate directly with cache 110 in addition to the possibility of communicating with cache 110 via system interconnect 108. Any initiator in system 100 may be coupled to cache 110 via a set of sideband signals.

Memory 112 may be any type of memory, and cache 110 is a multi-way cache, also referred to as a multi-way set-associative cache. Cache 110 may be a data cache or an instruction and data cache. Caches typically speed up access times for commonly used data and instructions, due, for example, to being faster than memory 112 or closer to a requestor than memory 112. Note that any of the bus initiators in system 100 may also include its own local or level 1 (L1) cache for faster memory access times. In the illustrated embodiment, cache 110 may be referred to as a level 2 (L2) cache, in which the local caches are accessed first, followed by the L2 cache, and then followed by the system memory. System 100 may include any number of caches organized in any number of levels. Typically, the higher level caches, such as L2 or level 3 (L3) caches are referred to as common or shared caches which may be used by multiple bus initiators.

In the case of multiple bus initiators in which some or all have their own local caches (e.g. L1 caches), it is important to maintain value coherency such that any read access request from a bus initiator receives the most recently modified data corresponding to a particular address in memory 112 (or in any lower level memory of system 100). For example, if data is stored in an L1 cache of one of the initiators, any modification to the data in this L1 cache needs to be flushed (or provided) to a common cache, such as a higher level L2 or L3 cache, when another initiator wants to read or modify that data. Likewise, if one initiator wants to modify any data, any other initiator which is holding an unmodified copy of that data will need to remove it so that a next read gets the correct modified version. Therefore, memory coherency ensures that each initiator in a multiple initiator data processing system, such as system 100, has access to the most recently modified data corresponding to a particular address in the memory, such as memory 112, or in a lower level cache of the system. This may be done through the use of a coherency protocol. Such coherency protocols are well known by those skilled in the art, and may include MESI, MOESI, or other protocols and variants thereof. Each protocol may use a set of bits stored within the cache to implement memory coherency. For example, the MESI protocol, as known in the art, uses a set of coherency bits to define four states: Modified, Exclusive, Shared, and Invalid. In this example, each cache entry stores corresponding coherency bits which keeps track of the MESI state for that entry. Therefore, each coherency protocol may use any number of coherency bits, as needed, to define any number of coherency states, as needed, to implement the particular coherency protocol.

Figure 2:
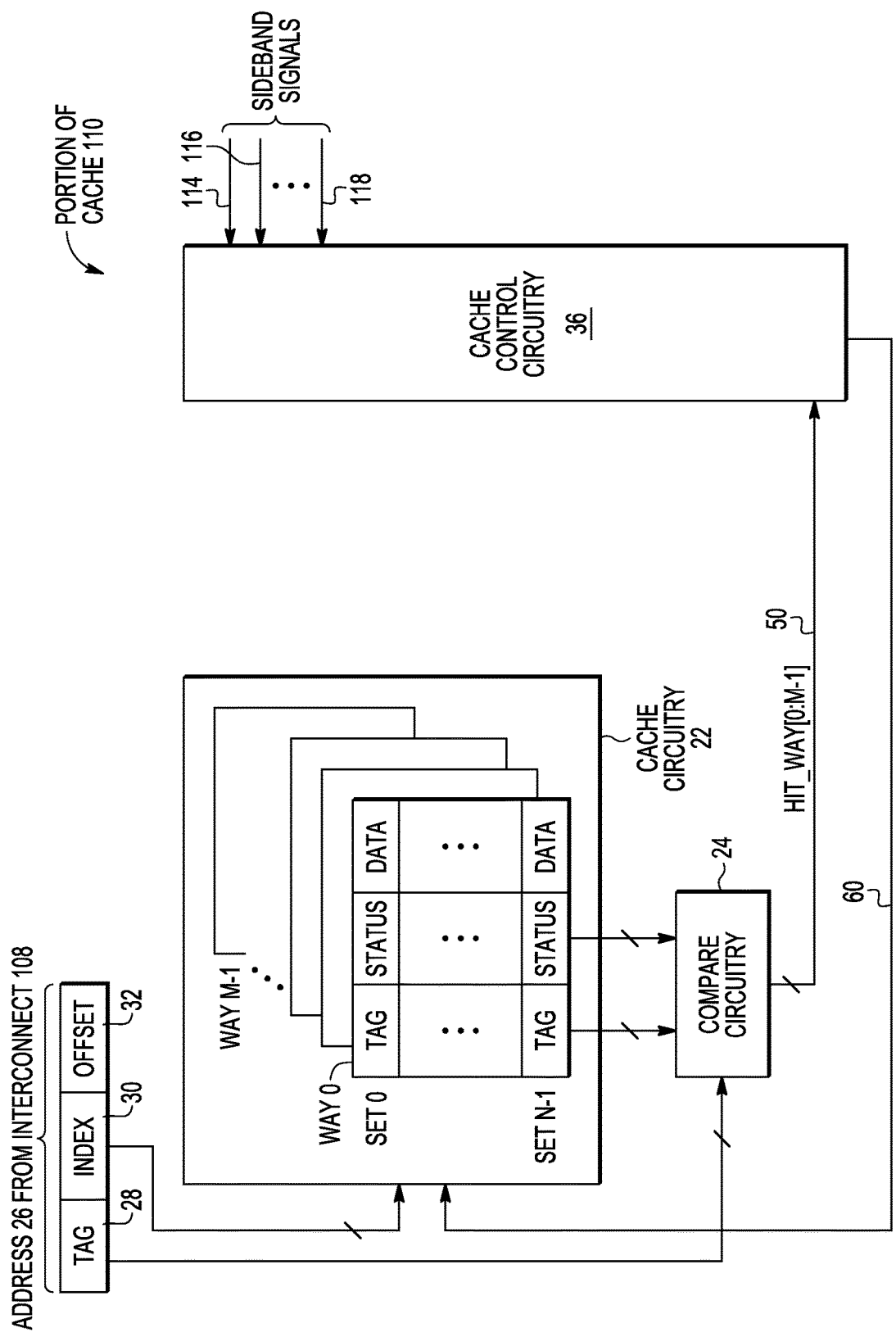
FIG. 2 illustrates, in block diagram form, a portion of the cache of FIG. 1, in accordance with one embodiment of the present invention.

FIG. 2 illustrates a portion of cache 110 in accordance with one embodiment of the present invention. Cache 110 is a multi-way set-associative cache having "N" sets and "M" ways. Cache 110 may have any number of sets and any number of ways. Note that, as used herein, a cache line or cache entry refers to an intersection of a cache way and a set. For example, way 0 includes N cache lines, each corresponding to one of set 0 to set N−1. Therefore, when a way is replaced, the information in one or more cache lines (which is selected by index 30, as will be described below) is actually replaced. That is, the entire way may not be replaced, but only one or more particular lines or entries.

In the illustrated embodiment, cache circuitry 22 is storage circuitry which stores information in each of a plurality of cache lines or entries. For example, cache circuitry 22 includes tag, status, and data information for the cache lines or entries. Address 26, received from an initiator via interconnect 108, includes tag 28, index 30, and offset 32. Index 30 is provided to cache circuitry 22 which indicates a particular cache line or entry (i.e. one of set 0 to set N−1). Compare circuitry 24 is coupled to receive tag 28 and is coupled to cache circuitry 22 to receive tag and status information. Based on this received information, compare circuitry 24 determines whether there has been a cache hit or a cache miss in the cache ways at the set indicated by index 30 (and qualified by using a valid bit which may be included in the status bits). In the illustrated embodiment, a plurality of hit/miss signals labeled HIT_WAY[0:M−1] 50 are provided to cache control circuitry 36. Each HIT_WAY[0:M−1] 50 signal indicates whether or not there has been a cache hit for its corresponding way in cache circuitry 22. Alternate embodiments may use a cache miss signal in addition to or instead of a cache hit signal.

Cache control circuitry 36 is coupled to cache circuitry 22 and compare circuitry 24, and also receives sideband signals 114, 116, and 118. Cache control circuitry 36 may be coupled to other portions of cache 110, as needed, to receive cache control signals or provide information that is needed in order to perform cache control. Note that any arrows in FIG. 2 may be considered to be one or more signals or one or more conductors in alternate embodiments, regardless of whether a hash line is used in FIG. 2.

Each cache line includes status information, which may include any type of status information for that particular cache line, such as a valid bit, in which the status information can be updated or provided by cache control circuitry 36 for storage into cache circuitry 22 when a cache line is updated or a new cache line is allocated or created. In one embodiment, these status bits also include coherency bits which indicate a state of a first cache coherency protocol for the cache line (in a first protocol mode). As discussed above, as an example herein, it will be assumed that the first coherency protocol is the MESI protocol in which 2 or more bits may be used to indicate whether the cache line is in the M, E, S, or I state. These MESI bits are updated by the cache control circuitry as needed in accordance with the MESI protocol, which is known in the art. These same coherency bits, though, are also used to identify states of a second cache coherency protocol when a paced data transfer operation is indicated (in a second protocol mode). In the case of a paced data transfer operation, the same coherency bits stored in the status bits of the cache line have a different meaning, corresponding to a state of a paced data transfer rather than a state of the MESI coherency protocol. For paced data transfers, cache control circuitry updates the coherency protocol bits as appropriate to indicate the state of the paced data transfer, details of which will be described below in reference to FIGS. 3-5.

In one embodiment, determining whether a cache line is to be used as a normal cache line (which stores duplicative information of memory 112 with MESI coherency bits) or a paced cache line (which stores data corresponding to a paced data transfer with coherency bits indicating a state of the paced transfer) is determined based on the address of the cache line. In one embodiment, when an address falls with a first subset of addresses, the cache line is treated as a normal cache line and when the address falls into a second subset of addresses, the cache line is treated as a paced cache line. In an alternate embodiment, along with each address provided to cache 100, an indication is provided separately from the initiator providing the address via a sideband signal to cache 100 which indicates whether the address corresponds to a normal cache transaction or a paced data transfer transaction.

In one embodiment, paced data transfers ensure that data transfers between producers and consumers of system 100 stay synchronized, in which any of the bus initiators in system 100 may be a consumer or a producer. Therefore, with paced data transfers, producers do not overwrite data prior to being consumed, and consumers to not read old data prior to being updated. In system 100, cache 110 is used to implement these paced data transfers, in which, for paced data transfers, the coherency protocol bits are used to maintain the state, and thus maintain synchronization, of the data transfers. In one embodiment, cache 110 is used to implement a circular queue structure for paced data transfers between a producer and consumer. Alternatively, cache 110 is used to implement a linked list structure for paced data transfers. Note that implementing the first coherency protocol, such as the MESI protocol, ensures that normal cache operations maintain value coherency with main memory 112, or at least ensure that the most up to date data value is provided in response to a read request by a bus initiator. However, implementing the second coherency protocol for data transfer operations using cache 110 involves the consumer and producer of the paced data transfer, and does not involve memory 112. That is, for a paced data transfer operation, data is maintained synchronized and coherent between the producer and consumer, but is not necessarily maintained coherent with memory 112.

The same coherency bits in the status field are used for both normal cache operations and paced data transfer operations. In this case of normal operations, the coherency bits are used to implement the first coherency protocol, such as MESI, in the current example. In the case of paced data transfer operations, the coherency bits are used to implement the second coherency protocol for the paced data transfer, which, on one embodiment, includes three states: Idle, Modified, and Shared. These have different meanings than the four states of the MESI protocol. However, there are sufficient coherency bits for the MESI protocol in the status field of a cache line to be able to implement these three states of the second protocol by reusing, e.g. redefining, the coherency bits to refer to the second coherency protocol for a paced data transfer. In one embodiment, a first subset of the coherency bits in the status field are used for normal cache operations to differentiate the states of the first coherency protocol while a second subset of the coherency bits in the status field are used for paced data transfer operations to differentiate the states of the second coherency protocol, in which the first and second subsets may be mutually exclusive or non-overlapping subsets, overlapping subsets, or the same subset.

Figure 3:
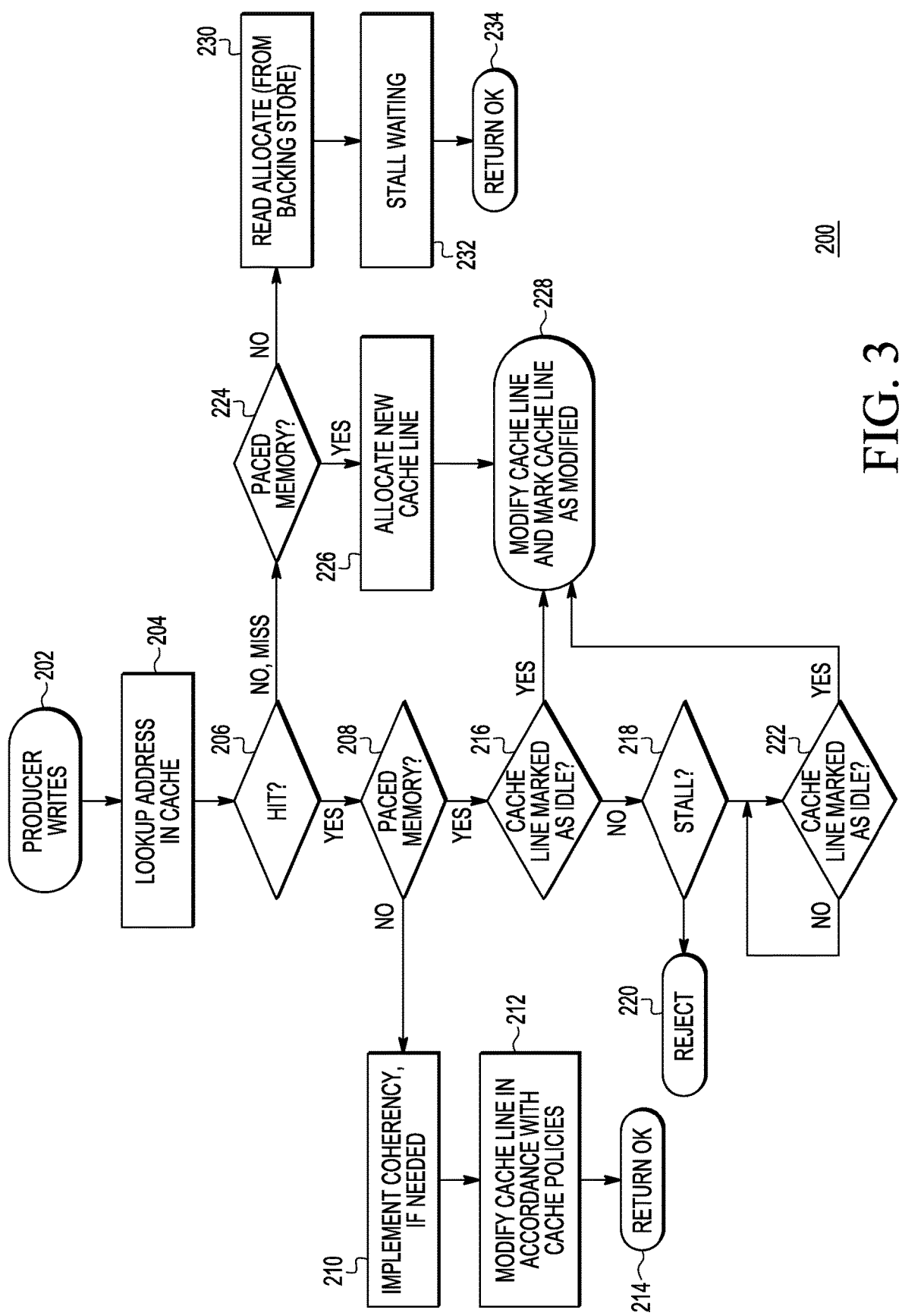
FIG. 3 illustrates, in flow diagram form, a method of operating the cache of FIG. 2 with respect to a producer, in accordance with one embodiment of the present invention.
Figure 4:
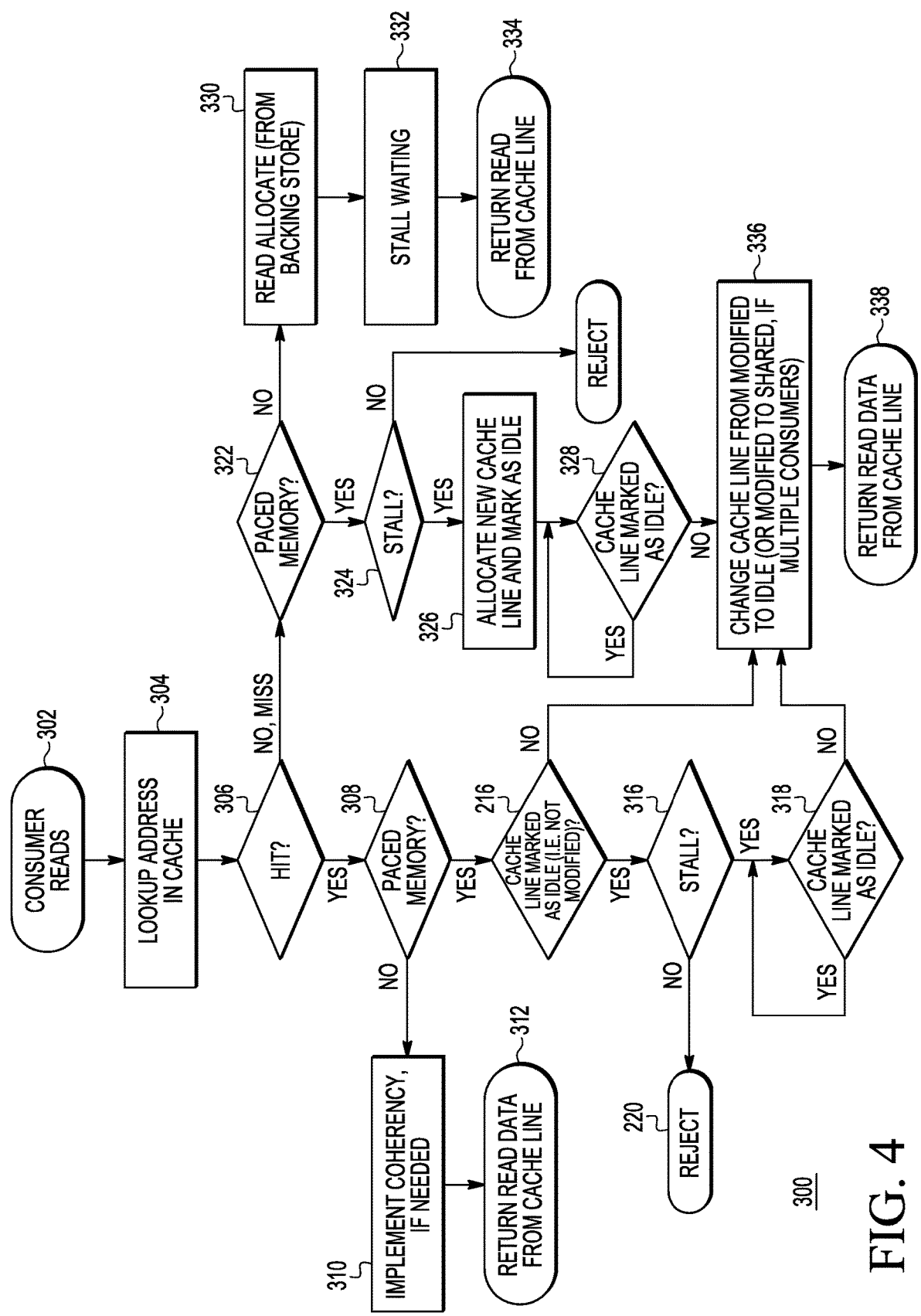
FIG. 4 illustrates, in flow diagram form, a method of operating the cache of FIG. 2 with respect to a consumer, in accordance with one embodiment of the present invention.

FIGS. 3 and 4 illustrate, in flow diagram form, methods of operating cache 110, in accordance embodiments of the present invention. FIG. 3 illustrates a method 200 of operating cache 110 with respect to a producer. Method 200 begins with block 202 in which a producer provides a write request having an associated write address and write data. In block 204, the write address is looked up in cache circuitry 22 to determine if the write address hits or misses in the cache. If the write address hits (i.e. is present) in cache circuitry 22, method 200 proceeds from decision diamond 206 to decision diamond 208. In decision diamond 208, it is determined if the write address corresponds to a paced memory address or not. In one embodiment, the write address is compared to a range (or multiple ranges) of addresses corresponding to paced memory addresses, and if the write address falls within a range corresponding to paced memory addresses, then the write address is considered a paced memory address. In other embodiments, a sideband signal can be provided from the producer with the write request to cache control circuitry to indicate whether the write address is considered a paced memory address. In yet other embodiments, other methods may be used to indicate whether a particular address corresponds to a paced memory address or not, and such information may be stored, for example, via control bits or control registers, within cache control circuitry 36 or elsewhere within system 100.

At decision diamond 208, if the write address is not a paced memory address, the write transaction corresponds to a normal cache transaction in which the first coherency protocol is implemented, if needed, in block 210, corresponding to the first protocol mode. For example, the MESI coherency protocol is implemented, as needed. Then, in block 212, the cache line which resulted in the cache hit (also referred to as the hit cache line) is modified in accordance with cache policies. For example, the cache policies may indicate a write through cache transaction or a copyback cache transaction. Also, the MESI coherency bits in the status field of the hit cache line are updated, as needed, to reflect the appropriate MESI state of the modified cache line. The write transaction successfully completes at block 214.

If, however, at decision diamond 208, the write address is determined to be a paced memory address, it is determined, at decision diamond 216, if the cache line is marked as Idle. Therefore, since the write address which resulted in the cache hit is a paced memory address, the coherency bits of the hit cache line indicate a state of a paced data transfer operation in accordance with the second protocol mode and does not indicate a MESI coherency state. However, note that the same coherency bits within the status field that would be used for indicating a MESI coherency state are assessed to determine the state of the paced data transfer operation. For a paced data transfer operation, the state of Idle indicates that the cache line exists for the paced operation and that the cache line has not yet been modified, has already been read by a consumer, and has not yet been evicted from the cache. Therefore, if the hit cache line is marked as Idle, it can be updated with the write request. At block 228, the hit cache line is modified with the new write data and is now marked as modified. At this point, this cache line is waiting to be consumed by a consumer via a read request.

If, at decision diamond 216, the hit cache line is not marked as Idle, it has not yet been read by a consumer and thus cannot be modified, otherwise, data would be lost. In this case, based on the policies of cache 110, the producer write request is either rejected or stalled (at decision diamond 218). If the cache policy indicates reject, then the producer write is simply rejected at block 220 and the producer has to try again at a later time. If the cache policy indicates stall, then method 200 proceeds to decision diamond 222 where it stalls until the hit cache line is marked as Idle. Once the data of the hit cache line is consumed by a consumer, the coherency bits of the paced cache line will be marked as Idle, as will be described in reference to FIG. 4 below, and at this point, the write need not be stalled anymore. Therefore, once the hit cache line it is marked as Idle, method 200 proceeds from decision diamond 222 to block 228, where the cache line is modified, and the coherency bits are updated to reflect its state as Modified.

If, at decision diamond 206, the write address misses (i.e. is not present) in cache circuitry 22, method 200 proceeds from decision diamond 206 to decision diamond 224. It is then determined if the write address corresponds to a paced memory address or not, using any of the techniques described above, e.g., in reference to decision diamond 208. If not, the write transaction corresponds to a normal cache transaction and a read allocate is performed in block 230. A read allocation creates a new cache line for the write address of the write request in cache circuitry 22 and retrieves, from the backing store (corresponding to memory 112 in this embodiment), the data currently residing at the write address and stores this data into the new entry. A new entry or cache line can be created by selecting a cache line that is empty or invalid, or by evicting an existing cache line using any algorithm, such as Least Recently Used (LRU), etc., to select a cache line for eviction. Once this new cache line is allocated, in block 232, the waiting is stalled and the new cache line can be updated with the new write data of the producer write request. As discussed with respect to block 212, the cache line can be updated with a write through cache transaction or a copyback cache transaction, depending on the cache policy. Also, the MESI coherency bits in the status field of the hit cache line are updated, as needed, to reflect the appropriate MESI state of the modified cache line. The write transaction successfully completes at block 234.

If, at decision diamond 224, the write address does correspond to a paced memory address, a new cache line is allocated for the write data in block 226. A new cache line can be allocated by selecting a cache line that is empty or has already been consumed in which any algorithm, such as Least Recently Used (LRU), etc., can be used to select a cache line for eviction. Then, in block 228, the newly allocated cache line is modified with the write data and the cache line is marked as Modified. Note that since the "yes" path from decision diamond 224 refers to handling a miss for a paced memory address, the backing store (e.g. memory 112) is not accessed to complete the producer write, unlike handling a miss for a normal cache operation in block 230.

FIG. 4 illustrates a method 300 of operating cache 110 with respect to a consumer. Method 300 begins with block 302 in which a consumer provides a read request having an associated read address. In block 304, a lookup of the read address is performed in cache circuitry 22. If the read address hits (i.e. is present) in cache circuitry 22, method 300 proceeds from decision diamond 306 to decision diamond 308. In decision diamond 308, it is determined if the read address corresponds to a paced memory address or not. As with the write address discussed in reference to decision diamond 208 above, the read address can be compared to a range (or multiple ranges) of addresses corresponding to paced memory addresses, and if the read address falls within a range corresponding to paced memory addresses, then the read address is considered a paced memory address. In other embodiments, a sideband signal can be provided from the consumer with the read request to cache control circuitry to indicate whether the write address is considered a paced memory address. In yet other embodiments, other methods may be used to indicate whether a particular address corresponds to a paced memory address or not, and such information may be stored, for example, via control bits or control registers, within cache control circuitry 36 or elsewhere within system 100.

At decision diamond 308, if the read address is not a paced memory address, the read transaction corresponds to a normal cache transaction in which the first coherency protocol is implemented, if needed, in block 310, corresponding to the first protocol mode. For example, the MESI coherency protocol is implemented, as needed. Then, in block 312, read data is returned to the consumer from the cache line which resulted in the cache hit to complete the read transaction.

If, however, at decision diamond 308, the read address is determined to be a paced memory address, it is determined, at decision diamond 314, if the cache line is marked as Idle. Therefore, since the read address which resulted in the cache hit is a paced memory address, the coherency bits of the hit cache line indicate a state of a paced data transfer operation in accordance with the second protocol mode and does not indicate a MESI coherency state. However, note that the same coherency bits within the status field as would be used for indicating a MESI coherency state are assessed to determine the state of the paced data transfer operation. For a paced data transfer operation, the state of Idle indicates that the cache line exists for the paced operation and that the cache line has not yet been modified, and therefore does not include new data to be consumed.

If, at decision diamond 316, the cache line is not marked as Idle, method 300 proceeds to block 336 in which the coherency bits are changed from Modified to Idle or Shared. In the case of a single consumer of the cache line data, the coherency bits are modified to indicate the Idle state. However, in one embodiment, system 100 may allow for multiple consumers to read the same data. In this embodiment, the second protocol uses the Shared state. At block 336, if there are multiple consumers for the read data, the coherency bits are changed to indicate a Shared state. Then at block 338, read data from the cache line is returned to the consumer. In the case of multiple consumers in which the coherency bits are changed to indicate the Shared state, after the last consumer needing to read the data has read the data, an explicit command may be used to update the coherency bits of the cache line to indicate the Idle state again.

If, at decision diamond 316, the hit cache line is marked as Idle (and not Modified), then depending on the policies of cache 110, the consumer read request is either rejected or stalled. If the cache policy indicates reject, then the consumer read is simply rejected at block 320 and the consumer has to try again at a later time. If the cache policy indicates stall, then method 300 proceeds to decision diamond 318 where it stalls until the hit cache line is no longer marked as Idle. Once the data of the hit cache line is modified by a producer, the coherency bits of the paced cache line will be marked as Modified (or, in the case of multiple consumers, Shared, as was discussed above). At this point, the read need not be stalled anymore, and method 300 proceeds from decision diamond 318 to block 336, in which the coherency bits of the cache line are changed from Modified to either Idle or Shared. The read data from the cache line is then returned to the consumer at block 338.

Referring back to decision diamond 306, if the read address misses (i.e. is not present) in cache circuitry 22, method 300 proceeds to decision diamond 322. It is then determined if the read address corresponds to a paced memory address or not, using any of the techniques described above, e.g., in reference to decision diamond 308. If not, the read transaction corresponds to a normal cache transaction and a read allocate is performed in block 330. A read allocation creates a new cache line for the read address in cache circuitry 22 and retrieves, from the backing store (corresponding to memory 112 in this embodiment), the data residing at the read address and stores this data into the new entry. A new entry or cache line can be created by selecting a cache line that is empty or invalid, or by evicting an existing cache line using any algorithm, such as Least Recently Used (LRU), etc., to select a cache line for eviction. Once this new cache line is allocated, in block 330, the waiting is stalled and the new cache line can be updated with the read data of the consumer read request. Also, the coherency bits in the status field of the hit cache line are updated, as needed, to reflect the appropriate MESI state of the modified cache line. The read data is then returned from the newly allocated cache line to the consumer to complete the consumer read request at block 334.

If, at decision diamond 332, the write address does correspond to a paced memory address, the cache policy determines whether the consumer read is rejected or stalled. In the case that the cache policy indicates a reject should occur, the consumer read is rejected at block 336 and the consumer needs to try the request again at a later time. If a stall is indicated, then at block 326 a new cache line is allocated in cache 22 (by selecting an empty cache line or evicting a selected cache line) and the newly allocated cache line is marked as Idle. In this case, since the cache line does not currently exist in the cache (causing the miss in the cache), the consumer read needs to wait until its read address is available and ready to be consumed from the cache. Therefore, at decision diamond 328, method 300 waits until the cache line is no longer marked as Idle (meaning that a producer has modified the cache line). Once the cache line is no longer marked as Idle, method 300 proceeds to block 336, in which the coherency bits are updated to indicate the Modified state (or Shared state in the case of multiple consumers), and read data from the cache line is returned to the consumer. Note that since the "yes" path from decision diamond 322 refers to handling a miss for a paced memory address, the backing store (e.g. memory 112) is not accessed to complete the consumer read, unlike handling a miss for a normal cache operation in block 330.

Figure 5:
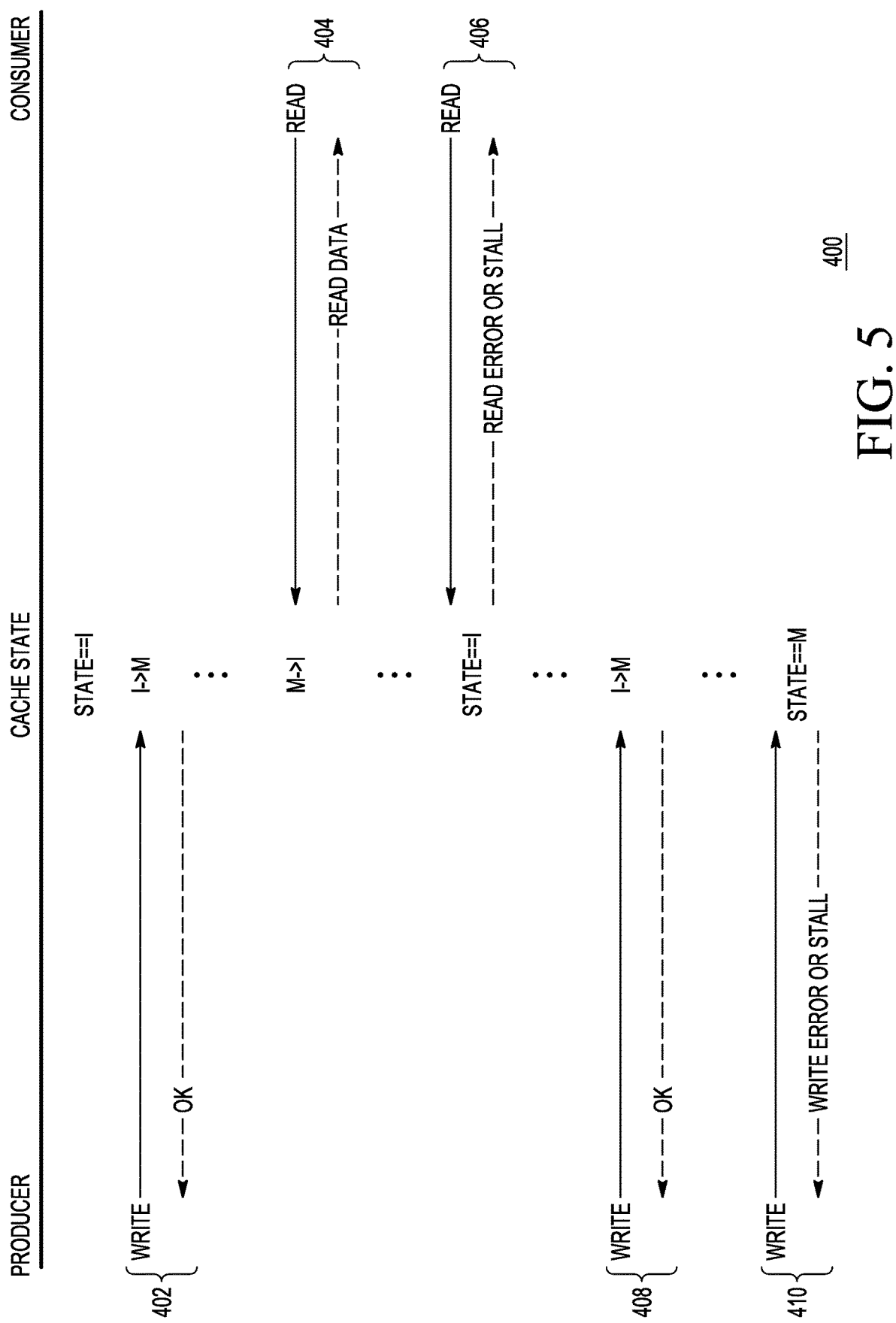
FIG. 5 illustrates, in diagrammatic form, examples of paced data transactions to and from a cache line, in accordance with one embodiment of the present invention.

FIG. 5 illustrates a diagram 400 of various producer and consumer paced data transactions to and from a cache line present in cache 110, along with the corresponding state indicated by the coherency bits in the cache line. Note that in the examples of FIG. 5, the coherency bits are indicating states of the second coherency protocol used for paced data transfers and not states of the first coherency protocol used for normal cache transactions (such as the MESI coherency protocol). In diagram 400, time progresses from the top of the list of transactions to the bottom of the list of transactions.

Initially, prior to transaction 402, the coherency bits indicate the Idle state ("I"). Transaction 402 illustrates a producer write transaction to the cache line. Since the state of the cache line is Idle, the consumer write is successfully performed to the cache line (as indicated by the return "OK"), and the state is updated to the Modified state ("M"). Transaction 404 illustrates a consumer read transaction from the cache line. Since the cache line is marked as Modified, the consumer successfully reads from the cache line and read data of the cache line is successfully provided back to the consumer. The state of the cache line is also changed back to Idle, since the read data has been consumed from the cache line. Transaction 406 illustrates a subsequent consumer read from the cache line. However, since the cache line is now marked as Idle (due to transaction 404), depending on the policies of the cache, the read is disallowed and rejected with error or the read is stalled until the cache line is once again marked as Modified (by a producer).

Transaction 408 illustrates a producer write transaction to the cache line. Since the cache line is marked at Idle at this point, the consumer write is successfully performed to the cache line. Transaction 410 illustrates a subsequent write transaction to the cache line. However, the cache line is still marked as Modified, indicating it has not been read by a consumer yet. Therefore, depending on the policies of the cache, the write is disallowed and rejected with error or the write is stalled until the cache line is once again marked as Idle (by a consumer).

In this manner, the transactions to the cache line of FIG. 5 can be properly paced and synchronized to ensure that data not yet read does not get prematurely overwritten (resulting in lost data) and that old (likely incorrect) data does not get returned. By using cache 110 and the coherency bits of cache circuitry 22 to handle such paced transactions, existing mechanisms are used rather than requiring new hardware mechanisms. Furthermore, actions such as rejecting read or write requests or stalling are commonly used in a cache for normal cache operations, and therefore, the mechanisms required to implement these functions for a paced transactions are already in place. Also, the use of the same coherency bits for both a first coherency protocol during normal cache operations and a second coherency protocol during paced data transfer operations prevents the need from having to add additional status bits to the cache. The paced data transfers using the cache can be used to support various synchronized data transfers, such as ring buffers and linked lists. Unlike normal cache operations, these paced data transfers do not require interaction with the backing store (such as memory 110). In one embodiment, the maximum number cache lines that can also be used as paced cache lines is limited within in a given set. In this case, when the maximum number of paced lines have been used, and there is no paced cache line available for eviction, a request corresponding to a paced data transfer will be stalled or rejected. Note that a paced cache line in the modified state cannot be evicted since the modified data of the cache line would be lost.

Therefore, by now there has been provided a method of using existing coherency bits of a cache to implement different protocol modes, one to implement normal cache operations and the other to implement paced data transfer operations. Either memory ranges or additional sideband signals may be used to indicate whether or not a particular address is to be treated as a normal cache location for a normal cache operation or as a paced memory location for a paced data transfer operation. In this manner, cache lines of the cache can by dynamically treated as cache lines in normal cache operations or as cache lines in paced data transfer operations. For example, during operation, the address ranges may be updated. Furthermore, note that in alternate embodiments, a cache used to implement both normal cache operations and paced data transfer operations, such as cache 110, can be distributed throughout system 100, and need not be all contained in a single cache (as illustrated in FIG. 1).

Although one type of architecture for cache 110 has been illustrated in FIG. 2, alternate embodiments of cache 110 may use any desired or appropriate architecture. The architecture illustrated in FIG. 2 is merely intended to be one possible representative architecture. Any cache architecture that allows for the dual use of the coherency bits may be used.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. Also for example, in one embodiment, the illustrated elements of system 100 are circuitry located on a single integrated circuit or within a same device. Alternatively, system 100 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, cache 110 may be distributed throughout system 100. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a data processing system includes an interconnect; a plurality of bus initiators, each bus initiator operably coupled to the interconnect; a cache operably coupled to the interconnect, the cache is accessible by each bus initiator of the plurality of bus initiators, the cache including a plurality of entries, each entry including a status field, the status field including coherency bits; and a cache controller, wherein when an entry of the plurality of entries is in a first protocol mode, the cache controller uses the coherency bits of the entry in implementing a first cache coherency protocol for data of the entry, wherein when the entry is in a second protocol mode, the cache controller uses the coherency bits of the entry in implementing a second cache coherency protocol, wherein the second cache coherency protocol is utilized in implementing a paced data transfer operation between a first bus initiator of the plurality of bus initiators and a second bus initiator of the plurality of bus initiators using the cache entry; and at least one lower level memory, wherein the first cache coherency protocol maintains value coherency with a memory address of the at least one lower level memory associated with the entry, wherein the second cache coherency protocol does not maintain value coherency with a memory address of the at least one lower level memory associated with the entry. In one aspect of this embodiment, an entry of the plurality of entries is in the second protocol mode based on the entry including data written or read to a memory address within a specific address range. In another aspect, an entry of the plurality of entries is in the second protocol mode based on a side band signal to the cache controller. In a further aspect, the sideband signal is generated by the transaction initiator. In yet another aspect, in the second protocol mode, the cache controller changes the coherency bits of an entry of the plurality of entries to indicate a second coherency bit state from a first coherency bit state in response to a second bus initiator reading a memory address where the entry was allocated to the memory address, wherein data of the entry was written to the entry by a first bus initiator writing to the memory address as part of a paced data transfer operation from the first bus initiator to the second bus initiator, wherein the first coherency bit state indicates an exclusive coherency state in the first cache coherency protocol and the second coherency bit state indicates an invalid coherency state in the first cache coherency protocol. In another aspect, the first cache coherency protocol is characterized as a MESI cache coherency protocol. In another aspect, the cache is characterized as multi-way, set associated cache.

In another embodiment, a method of operating a cache includes determining whether data in a cache entry of a cache is to be processed under a first cache coherency protocol or a second cache coherency protocol; if determined to be processed under a first cache coherency protocol, using coherency bits of the cache entry to implement the first cache coherency protocol for the data of the cache entry; If determined to be processed under the second cache coherency protocol, using the coherency bits of the cache entry to implement the second cache coherency protocol for the data of the cache entry wherein the data is read by a second bus initiator as part of a paced data transfer operation between a first bus initiator and the second bus initiator, wherein the first bus initiator, the second bus initiator, and the cache are each operably coupled to the interconnect. In one aspect of this another embodiment, the first cache coherency protocol is characterized as a MESI cache coherency protocol. In another aspect, the using coherency bits to implement the first cache coherency protocol includes using a first subset of the cache coherency bits to differentiate different states of the first cache coherency protocol, wherein the using cache coherency bits to implement the second coherency protocol includes using a second subset of the cache coherency bits to differentiate different states of the second cache coherency protocol. In yet another aspect, the first cache coherency protocol maintains value coherency for a memory address of at least one lower level memory associated with the cache entry, wherein the second cache coherency protocol does not maintain value coherency for a memory address of the at least one lower level memory associated with the cache entry. In another aspect, under the second cache coherency protocol, the data is written to the cache entry by the first bus initiator writing to a memory address, wherein the cache entry is allocated to the memory address as part of a paced data transfer operation; and under the second cache coherency protocol, as part of the paced data transfer operation, the second bus initiator receives the data from the cached entry by performing a read operation to the memory address. In a further aspect, under the second cache coherency protocol, in response to the read operation, the cache coherency bits are changed from a first bit state to a second bit state, wherein the second bit state is indicative of an invalid state in the first cache coherency protocol. In yet a further aspect, under the second cache coherency protocol, in response to the write operation, the cache coherency bits are set to the first bit state, wherein the first bit state is indicative of a modified state in the first cache coherency protocol. In yet another aspect, a write operation under the second cache coherency protocol includes a bus initiator writing data to a memory address where a cache entry is allocated to the memory address, wherein the write operation under the second cache coherency protocol is stalled or rejected if the cache coherency bits of the cache entry indicate that the cache entry is in a modified state. In a further aspect, the write operation under the second cache coherency protocol is completed to the cache entry if the cache coherency bits of the cache entry indicate that the cache entry is in an idle state. In another aspect, after the paced data transfer operation between a first bus initiator and the second bus initiator, performing a cache operation with the cache entry under the first cache coherency protocol. In another aspect, the method further includes performing a read operation under the second cache coherency protocol, wherein the performing the read operation includes a bus initiator reading from a memory address, where a cache entry is associated with the memory address, wherein the read operation is stalled or rejected if cache coherency bits of the cache entry indicate that the cache entry is in an idle state. In yet another aspect, the method further includes performing a read operation under the second cache coherency protocol, wherein the performing the read operation includes a bus initiator reading from a memory address, wherein the read operation is stalled or rejected if there is no cache entry associated with the memory address. In another aspect, the determining includes determining whether the cache entry is allocated to a memory address in a range of addresses. In another aspect, the determining is based on information received by the cache by a side band signal. In another aspect, if determined to be processed under the second cache coherency protocol for a multi-reader operation, in response to a read operation to a memory address that is first in time by a bus initiator of a plurality of read bus initiators, the cache coherency bits are changed from a first bit state to a second bit state, and in response to a read operation to the memory address that is last in time by a bus initiator of the plurality of read bus initiators, the cache coherency bits are changed from the second bit state to a third bit state.

What is claimed is:

1. A data processing system comprising:
an interconnect;
a plurality of bus initiators, each bus initiator operably coupled to the interconnect;
a cache operably coupled to the interconnect, the cache is accessible by each bus initiator of the plurality of bus initiators, the cache including a plurality of entries, each entry including a status field, the status field including coherency bits;
a cache controller, wherein when an entry of the plurality of entries is in a first protocol mode, the cache controller uses the coherency bits of the entry in implementing a first cache coherency protocol for data of the entry, wherein when the entry is in a second protocol mode, the cache controller uses the coherency bits of the entry in implementing a second cache coherency protocol, wherein the second cache coherency protocol is utilized in implementing a paced data transfer operation between a first bus initiator of the plurality of bus initiators and a second bus initiator of the plurality of bus initiators using the cache entry;
at least one lower level memory, wherein the first cache coherency protocol maintains value coherency with a memory address of the at least one lower level memory associated with the entry, wherein the second cache coherency protocol does not maintain value coherency with a memory address of the at least one lower level memory associated with the entry.

2. The data processing system of claim 1 wherein an entry of the plurality of entries is in the second protocol mode based on the entry including data written or read to a memory address within a specific address range.

3. The data processing system of claim 1 wherein an entry of the plurality of entries is in the second protocol mode based on a side band signal to the cache controller.

4. The data processing system of claim 3 wherein the sideband signal is generated by the transaction initiator.

5. The data processing system of claim 1 wherein in the second protocol mode, the cache controller changes the coherency bits of an entry of the plurality of entries to indicate a second coherency bit state from a first coherency bit state in response to a second bus initiator reading a memory address where the entry was allocated to the memory address, wherein data of the entry was written to the entry by a first bus initiator writing to the memory address as part of a paced data transfer operation from the first bus initiator to the second bus initiator, wherein the first coherency bit state indicates an exclusive coherency state in the first cache coherency protocol and the second coherency bit state indicates an invalid coherency state in the first cache coherency protocol.

6. The data processing system of claim 1 wherein the first cache coherency protocol is characterized as a MESI cache coherency protocol.

7. The data processing system of claim 1 wherein the cache is characterized as multi-way, set associative cache.

8. A method of operating a cache comprising:
- determining whether data in a cache entry of a cache is to be processed under a first cache coherency protocol or a second cache coherency protocol;
- if determined to be processed under a first cache coherency protocol, using coherency bits of the cache entry to implement the first cache coherency protocol for the data of the cache entry;
- If determined to be processed under the second cache coherency protocol, using the coherency bits of the cache entry to implement the second cache coherency protocol for the data of the cache entry wherein the data is read by a second bus initiator as part of a paced data transfer operation between a first bus initiator and the second bus initiator, wherein the first bus initiator, the second bus initiator, and the cache are each operably coupled to the interconnect.

9. The method of claim 8 wherein the first cache coherency protocol is characterized as a MESI cache coherency protocol.

10. The method of claim 8 wherein the using coherency bits to implement the first cache coherency protocol includes using a first subset of the cache coherency bits to differentiate different states of the first cache coherency protocol, wherein the using cache coherency bits to implement the second coherency protocol includes using a second subset of the cache coherency bits to differentiate different states of the second cache coherency protocol.

11. The method of claim 8 wherein the first cache coherency protocol maintains value coherency for a memory address of at least one lower level memory associated with the cache entry, wherein the second cache coherency protocol does not maintain value coherency for a memory address of the at least one lower level memory associated with the cache entry.

12. The method of claim 8 wherein:
- under the second cache coherency protocol, the data is written to the cache entry by the first bus initiator writing to a memory address, wherein the cache entry is allocated to the memory address as part of a paced data transfer operation;
- under the second cache coherency protocol, as part of the paced data transfer operation, the second bus initiator receives the data from the cached entry by performing a read operation to the memory address.

13. The method of claim 12 wherein under the second cache coherency protocol, in response to the read operation, the cache coherency bits are changed from a first bit state to a second bit state, wherein the second bit state is indicative of an invalid state in the first cache coherency protocol.

14. The method of claim 13 wherein under the second cache coherency protocol, in response to the write operation, the cache coherency bits are set to the first bit state, wherein the first bit state is indicative of a modified state in the first cache coherency protocol.

15. The method of claim 8 wherein a write operation under the second cache coherency protocol includes a bus initiator writing data to a memory address where a cache entry is allocated to the memory address, wherein the write operation under the second cache coherency protocol is stalled or rejected if the cache coherency bits of the cache entry indicate that the cache entry is in a modified state.

16. The method of claim 15 wherein the write operation under the second cache coherency protocol is completed to the cache entry if the cache coherency bits of the cache entry indicate that the cache entry is in an idle state.

17. The method of claim 8 wherein after the paced data transfer operation between a first bus initiator and the second bus initiator, performing a cache operation with the cache entry under the first cache coherency protocol.

18. The method of claim 8 further comprising performing a read operation under the second cache coherency protocol, wherein the performing the read operation includes a bus initiator reading from a memory address, where a cache entry is associated with the memory address, wherein the read operation is stalled or rejected if cache coherency bits of the cache entry indicate that the cache entry is in an idle state.

19. The method of claim 8 further comprising performing a read operation under the second cache coherency protocol, wherein the performing the read operation includes a bus initiator reading from a memory address, wherein the read operation is stalled or rejected if there is no cache entry associated with the memory address.

20. The method of claim 8 wherein the determining includes determining whether the cache entry is allocated to a memory address in a range of addresses.

21. The method of claim 8 wherein the determining is based on information received by the cache by a side band signal.

22. The method of claim 8 wherein:
- if determined to be processed under the second cache coherency protocol for a multi-reader operation, in response to a read operation to a memory address that is first in time by a bus initiator of a plurality of read bus initiators, the cache coherency bits are changed from a first bit state to a second bit state,
- in response to a read operation to the memory address that is last in time by a bus initiator of the plurality of read bus initiators, the cache coherency bits are changed from the second bit state to a third bit state.

* * * * *